United States Patent [19]

Kameya

[11] 3,908,177

[45] Sept. 23, 1975

[54] DELAY LINE DEVICE

[75] Inventor: Kazuo Kameya, Saitama, Japan

[73] Assignee: Toko, Inc., Tokyo, Japan

[22] Filed: Apr. 12, 1974

[21] Appl. No.: 460,377

[30] Foreign Application Priority Data

Apr. 20, 1973 Japan .............................. 48-44077

[52] U.S. Cl. ............... 333/29; 333/70 R; 333/70 S

[51] Int. Cl.$^{2}$... H03H 7/20; H03H 7/32; H03H 7/36

[58] Field of Search ................... 333/70 R, 29, 70 S

[56] References Cited

UNITED STATES PATENTS

| | | | |
|---|---|---|---|
| 2,702,372 | 2/1955 | Hickey | 333/70 R X |
| 2,946,967 | 7/1960 | Elders | 333/70 R X |

*Primary Examiner*—James W. Lawrence
*Assistant Examiner*—Marvin Nussbaum

[57] ABSTRACT

A delay line device comprising a first group of coils arranged in a first straight row, and a second group of coils arranged in a second straight row which is parallel to the first row. The second group of coils are generally deviated toward the input side of the delay line with respect to the first group of coils. Electrical connection is provided between the successive coils in the first and second groups. An input is imparted to the first one of the coils in the first group as viewed from the input side, and an output is taken from the last one of the coils in the second group also as viewed from the input side. The axial direction of each of the coils in the first and second groups is so selected that the couplings between the most adjacent ones of the coils in the first and second groups are positive and that the couplings between the coils in each of the groups are negative. Furthermore, each of the coils in the first and second groups is provided with a tap, which is grounded through a capacitor.

13 Claims, 15 Drawing Figures

DELAY LINE DEVICE

This invention relates to multi-section type networks adapted to constitute delay lines, low-pass filters or the like, and more particularly it pertains to improved construction of delay lines with excellent phase characteristics.

Various constructions for realizing high-performance delay lines have heretofore been proposed. One of these is disclosed in, for example, U.S. Pat. No. 2,946,967, which teaches the realization of a considerably miniaturized, high-performance delay line. The delay line according to said U.S. patent is based on the conception that among the coupling coefficients $a_1$, $a_2$, $a_3$ . . . between inductances defined in an article by Marcel J. E. Golay, entitled "The Ideal Low Pass Filter in the Form of a Dispersionless Lag Line," in *Proceedings of IRE*, March 1946, the higher-order coupling coefficients such as $a_3$, $a_4$ . . . are negligible in their effects on the phase characteristic of the delay line, and the delay line of said patent is designed such that optimal values may be selected only for $a_1$ and $a_2$.

However, strict experiments have shown that the characteristic of the delay line can further be improved by taking into account not only the coupling coefficients $a_1$ and $a_2$ but also the coupling coefficient $a_3$ and suitably selecting the value of the latter. In those experiments, a further coupling coefficient $a_4$ has also been taken into account and this has proved to improve the characteristic, but the degree of such improvement has not been so pronounced as compared with the improvement provided by taking into account $a_3$ in addition to $a_1$ and $a_2$.

It is a primary object of the present invention to provide an improved construction for a delay line with good phase characteristic.

It is another object of the present invention to provide a delay line which is super-miniature in size, low in cost and high in performance.

Other objects, features and advantages of this invention will become fully apparent from the following detailed description of some embodiments thereof taken in conjunction with the accompanying drawings.

FIGS. 1A and 1B are wiring diagrams showing an embodiment of the present invention.

FIG. 2 schematically illustrates the relative positions of coils and the relations between the coupling coefficients.

FIG. 3 is a circuit diagram of the delay line shown in FIG. 1.

FIG. 4 diagrammatically shows the equivalent circuit of FIG. 3.

FIG. 5 schematically illustrates the coupling coefficients in said embodiment.

FIGS. 6A, 6B, and 6C are views showing a specific construction of the delay line according to the present invention, A being a plan view thereof, B being a side view, C being a sectional view taken along line C–C' in FIG. 6B.

FIG. 7 is an exploded perspective view illustrating the mechanism for adjusting coupling coefficients.

FIGS. 8A and 8B schematically illustrate the arrangement of coils in another embodiment of the present invention.

Figure 11:
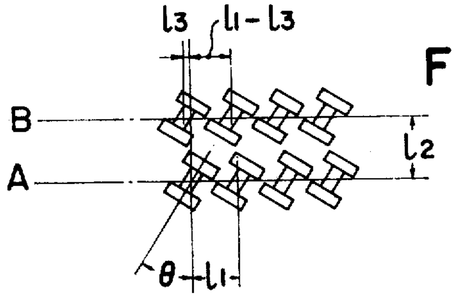

FIG. 11 schematically shows the arrangement of coils in still another embodiment of the present invention.

Figures 1A, 1B:
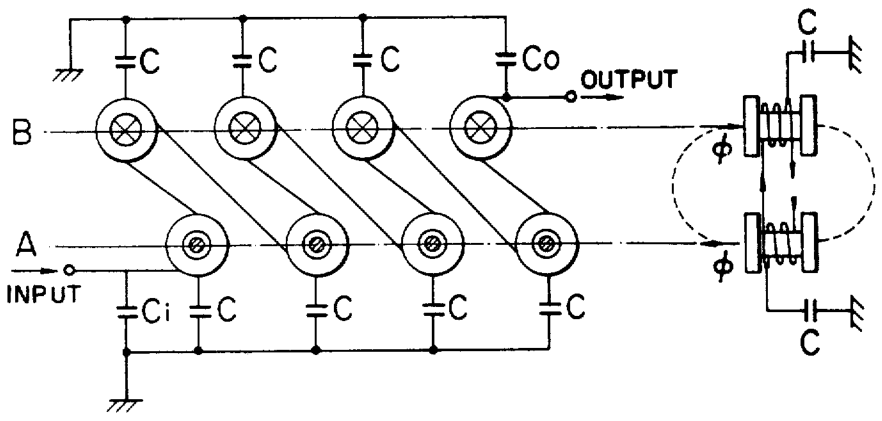

FIG. 1 shows a specific embodiment of the delay line according to the present invention. This is an assembly drawing of a super-miniature delay line of eight-section ladder type construction comprising eight coils each wound on a drum-shaped ferrite core, and primarily shows the arrangement and constructions of the coil portions. FIG. 1A is a plan view primarily illustrating the arrangement of the eight drum-shaped or spool bobbin type ferrite cores (which will be referred to as "drum-shaped ferrite cores" hereinafter for the sake of simplicity) and the sequence of connection from input to output. FIG. 1B is a side view of two connected intermediate ones of the eight coils, as viewed from the right.

As will be seen from FIG. 1, the eight coils are arrayed in two groups of four coils each or in two rows A and B. In each row, the coils are equally spaced apart. The sequence of connection from the input commences at the row A and shifts to the row B, thence back to the row A, thus alternating between the rows A and B until the connection reaches the output. As will further be seen in FIG. 1B, the turns of the coils in the row A are in the opposite direction to that of the turns of the coils in the row B, and accordingly the resultant fluxes are in the opposite directions. In other words, the coils in the rows A and B have positive couplings therebetween.

In contrast, all the coils in the row A are wound in the same direction and the fluxes emanating therefrom are also in the same direction. Thus, the coils in the row A have negative couplings therebetween. Likewise, the coils in the row B have negative couplings therebetween.

As will also be seen in FIG. 1B, a tap is led out from each coil and a capacitor C is connected thereto. The capacitors C are grounded at the other ends. Matching capacitors C*i* and C*o* are connected to the input and output, respectively. That one of the coils which is most adjacent the output is provided with no tap, for the purpose of matching. As will be seen in FIG. 1A, it should particularly be noted that the coils in the row A and those in the row B are shifted in position from each other in such a manner that the coils in the row B to which the coils in the row A are connected, are more remote from the output than the coils in the row A.

Figure 2:
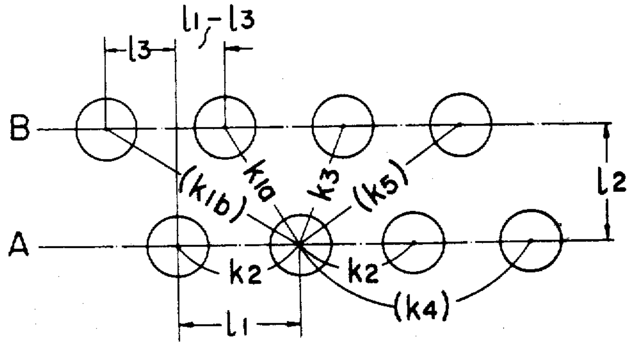

FIG. 2 shows the relative positions of the coils and the relationships in which the inter-coil coefficients exist. In FIG. 2, such relationships are shown with respect only to the coupling coefficient for the second coil in the row A or the third coil in the connection as viewed from the input side.

In FIG. 2, it is assumed that the inter-coil spacing is $l_1$ in both rows A and B, and that the spacing between these rows is $l_2$. Further, the row B is deviated toward the input side by $l_3$, with respect to the row A.

When the magnitude of each coupling coefficient as shown in FIG. 2 was measured under the above-described conditions, it was found not only that their values are variable with the relative positions of the coils, the values of the spacings, the configuration and dimensions and materials of the drum-shaped ferrite cores, but also that $(k_{1b})$, $(k_4)$ and $(k_5)$ are usually very low with respect to $k_{1a}$, $k_2$ and $k_3$. The reason is that those of the cores which are remotely located, have their fluxes absorbed by those of the cores which are located adjacent. For example, with regard to $(k_4)$, there is an inter-core spacing $2l_1$ but a core providing another $k_2$ is located intermediate of that spacing, i.e. at the distance of $l_1$ so that substantially all of the fluxes are absorbed toward that intermediate core, thus increasing $k_2$ and decreasing $(k_4)$. Moreover, the value of $(k_4)$ is greatly decreased as compared with the case where these coils are coupled at the interval of $2l_1$ but no intermediate core is present.

Figure 3:
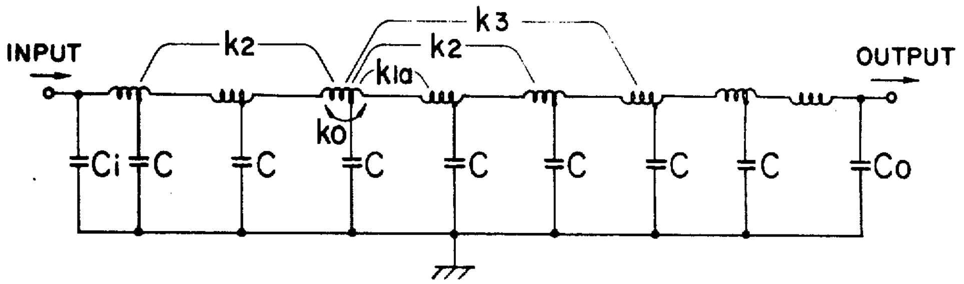

FIG. 3 shows the circuitry of the delay line described in connection with FIGS. 1 and 2. The third coil, as viewed from the input side, has the coupling as described with respect to FIG. 2, relative to the other coils. In FIG. 3, the couplings parenthetically indicated are of extremely small values and omitted while only those which have great effects on the electrical characteristic of the delay line are shown.

It has already been noted that the capacitors C are connected to the taps from the coils, and the coil portions disposed on both sides of the tap of each coil are coupled together with a coupling coefficient of $k_0$. It is to be noted that $k_0 \approx 1$ when the cores are such as drum-shaped ferrite cores. It is apparent that the other coils than said third coil have similar couplings, although these couplings are not represented herein.

Figure 4:
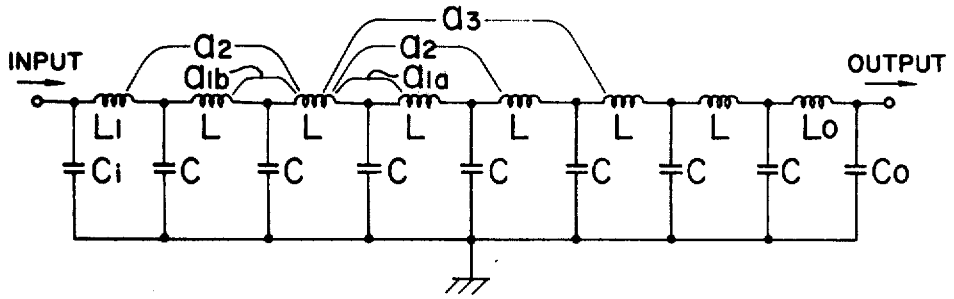

If FIG. 3 is re-depicted equivalently to the circuitry of the ladder type delay line having such couplings as described in said Golay article, the result will be FIG. 4. Except inductances $L_1$ and $L_0$ which are most adjacent the input and output, the other inductances are equally L. More strictly, there is a slight difference in inductance between a tapped coil of which the coil portion having a greater number of turns is positioned in the row A and a tapped coil of which the coil portion having a greater number of turns is positioned in the row B, but such a difference can be neglected.

The couplings between adjacent inductances are alternately $a_{1a}$ of positive value and $a_{1b}$ of positive value. The value of $a_{1a}$ is represented by the sum of positive coupling $k_0$ multiplied by a certain factor and positive coupling $k_{1a}$ multiplied by a certain factor, and the value of $a_{1b}$ is represented by positive coupling $k_0$ multiplied by a certain factor. Thus, $a_{1a}$ and $a_{1b}$ may be expressed: $a_{1a} = \alpha k_0 + \beta k_{1a}$ and $a_{1b} = \alpha k_0$, respectively. Hence, the value of $a_{1b}$ is slightly smaller than that of $a_{1a}$. Strictly considered, the other couplings are added, too, but their values are negligibly small. The difference in value between $a_{1a}$ and $a_{1b}$ is determined by the tapped position and the value of $k_{1a}$, and such difference should not be too great. In any event, there is established such a relation as $a_{1a} > a_{1b}$, and if all the couplings between adjacent inductances were equal and assuming $a_1$ to be the optimal value of such couplings, then optimal $a_{1a}$ and $a_{1b}$ may be found out within the range of $a_{1a} > a_1 > a_{1b}$.

The couplings $a_2$ between every second inductance must be of negative value, and most of them may be determined by the couplings $k_2$ multiplied by a certain factor. Strictly, these couplings also assume very slightly different values, i.e. $a_{2a}$ and $a_{2b}$, but the difference therebetween is negligible.

Figure 5:
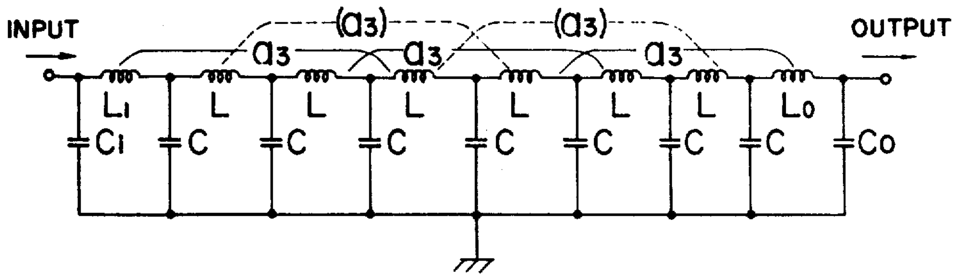

The couplings $a_3$ between every third inductance must be of positive value and are greatly affected by the positive coupling $k_3$. FIG. 5 is a full representation of $a_3$ alone.

In the eight-section delay line, $a_3$ can exist in maximum five regions, namely, the three regions as indicated by $a_3$ with solid line and the two regions as indicated by $(a_3)$ with dotted line, in FIG. 5. However, in the FIG. 1 construction according to an embodiment of the present invention, $a_3$ exists in the three solid-line regions and not in the two dotted-line regions. Again, strictly, there are extremely small couplings, rather of negative value, but these are also negligible in practice. As a result of study, it has been confirmed that the electrical characteristic is somewhat inferior in the case where $a_1$ and $a_2$ are of optimal values and $a_3$ assumes an optimal value only in the three regions than in the case where $a_3$ assumes an optimal value in all of the five regions, but is superior than in the case where $a_3$ is entirely absent. Further, in the case where $a_3$ exists in the three regions, the optimal value thereof must be somewhat greater than in the case where $a_3$ exists in the five regions.

Description will now be made of the reason why $a_1$ (in effect, a combination of $a_{1a}$ and $a_{1b}$), $a_2$ and $a_3$ can be selected to optimal values in the delay line construction of the present invention. In the interest of readier understanding, $a_2$ will first be considered. As noted previously, $a_2$ is determined substantially by $k_2$. Also, as can be seen from FIG. 2, $k_2$ is greatly affected by $l_1$, which in turn means that the optimal value may be obtained by varying the value of $l_1$.

In case of the drum-shaped ferrite cores of initial permeability of the order of 30 to 200 used with the ordinary miniature delay line, when the cores are brought into contact, the coupling coefficient is of the order of 0.2 to 0.3 while the absolute value of $k_2$ required by a delay line is of the order of 0.02 to 0.03. Consequently, an optimal value of $k_2$ may always be obtained by increasing the value of the inter-core spacing $l_1$ from the core-to-core contact condition. Under the core-to-core contact condition or closely spaced-apart condition of the cores, the slight difference in spacing results in a great difference in coupling coefficient, and therefore it is not desirable that a relatively great coupling, for example, a coupling of the order of 0.2 required of $a_1$ which will further be described, be obtained by bringing the cores close together.

The value of $a_3$ is greatly affected by the value of $k_3$, as noted previously. Under the core-to-core contact condition, the value of $k_3$ is within the range of 0.2 to 0.3, but as will be seen from FIG. 2, the spacing between the cores which determines the value of $k_3$ is $$\sqrt{l_2^2 + (l_1 - l_3)^2}$$

and the necessary value of $k_3$ is of the order of 0.01 to 0.02, and thus the optimal value of $k_3$ may be selected by suitably selecting the values of $l_2$ and $l_3$.

Lastly, the optimal value of $a_1$ is usually of the order of 0.17 to 0.2. In the present invention, it has already been noted that $a_{1a}$ and $a_{1b}$ are in such a relation as $a_{1a} > a_1 > a_{1b}$. It has also been noted that $a_{1a}$ is represented by $\alpha k_0 + \beta k_{1a}$ and that $a_{1b}$ is represented by $\alpha k_0$ alone. In contrast, $k_3$ is of the order of 0.01 to 0.02 as has been noted in connection with $a_3$, and accordingly $k_{1a}$ extends over a distance substantially equal to that of $k_3$ so that the value thereof is of the order of 0.01 to 0.02. Such value is considerably smaller than the necessary value 0.17–0.2 of $a_1$ and after all, most of the necessary value of $a_1$ is obtained by adjusting the tapped position. More specifically, the tap is led out at a point near 80% of the overall number of turns, and such adjustment of the tapped position can be done freely and stably, so that the optimal value of $a_1$ can also be obtained stably.

The attempt to obtain a great value of coupling by bringing the cores close together is not desirable because any slight variation in the spacing between the cores tends to result in a great variation in the value of the coupling. For this reason, according to the present invention, such great value of coupling is obtained by suitably selecting the tapped position of the coil while couplings of small values but substantially equal in magnitude are stably obtained by suitably selecting the spacings between adjacent cores.

If both the great value of coupling and the small values of couplings are to be obtained by varying the relative positions of the cores and if the couplings to be obtained are complex, any slight difference in the intercore spacing would result in a great difference in the great value of coupling and this also affects the small values of couplings, thus making it difficult to produce precise delay lines at a low cost and on a mass-production scale.

A further advantage of the present invention is thus: as is apparent from FIG. 2, the spacing between the cores which determines the value of $k_{1a}$ is $$\sqrt{l_2^2 + l_3^2}$$

and the spacing between the cores which determines the value of $k_3$ is $$\sqrt{l_2^2 + (l_1 - l_3)^2}$$

and therefore, $k_3$ and $k_{1a}$ can be selected to optimal values by suitably selecting $l_2$ and $l_3$. Consequently, $a_1$ and $a_3$ can be finely adjusted both separately and simultaneously by designing a construction which is capable of fine adjustment of $l_2$ and $l_3$.

Figure 6A:
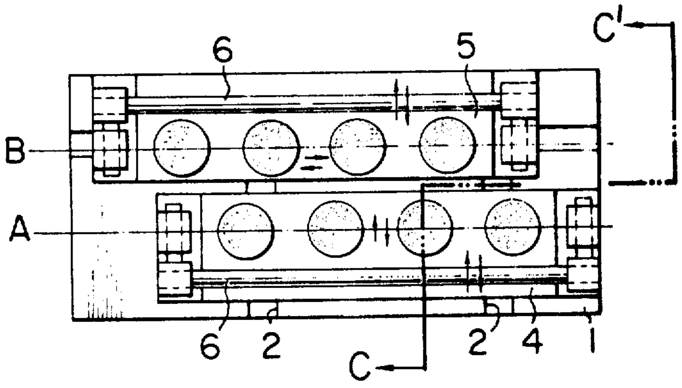
Figure 6C:
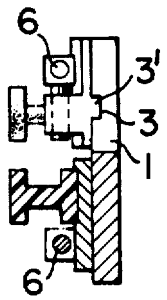
Figure 6B:
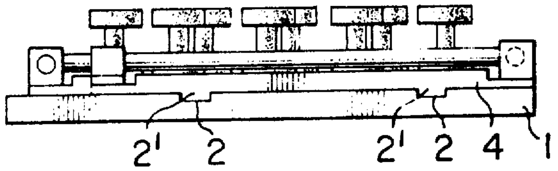

FIGS. 6A, 6B and 6C show an embodiment of the delay line according to the present invention which is provided with a fine adjustment mechanism and designed such that the positions of the coils in the rows A and B can be adjusted relative to each other. In the upper surface of a base plate 1, there are formed grooves 2 for permitting the coils in the row A to be moved transversely to the row A and a groove 3 for permitting the coils in the row B to be moved along the row B. The bottom surfaces of A-row coil base 4 and B-row coil base 5 are provided with protrusions 2' and 3' adapted for engagement with the grooves 2 and 3, respectively. The two bases are supported on the base plate 1 and, when the grooves and corresponding protrusions are disposed in engagement with each other, the two bases are smoothly movable transversely and longitudinally of the base plate, respectively. Thus, the value of $l_2$ may be adjusted by movement of the A-row coil base 4 and the value of $l_3$ by movement of the B-row coil base 5.

Figure 7:
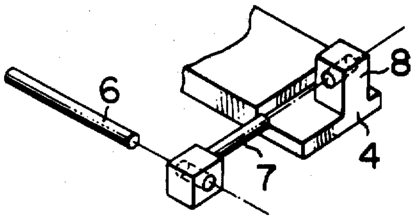

In addition to the above-described fine-adjustment mechanism for $a_1$ and $a_3$, the present embodiment may be provided with a fine-adjustment mechanism for $a_2$, an example of which is shown in FIG. 7. Ferrite bars 6 for adjusting $a_2$ are movable and extend along and outwardly of the coil rows A and B, respectively. By bringing these ferrite bars closer to the rows of coils, the value of $k_2$ and accordingly the absolute value of $a_2$ may be increased.

The ferrite bars 6 for adjusting $a_2$ have their opposite ends received in and adhesively secured to mounting openings formed in sliders 7 (only one of which is shown).

The sliders 7 are formed of an insulative material such as plastics or the like and the bar-like portions thereof are smoothly slidably received in openings formed in slider holders 8 provided at the opposite ends of the A-row and the B-row coil bases. Thus, by moving the sliders within the slider holder openings, the ferrite bars 6 for adjusting $a_2$ may be moved relative to the coils. After adjustment, all movable portions are adhesively secured.

Highly precise delay lines may thus be provided by effecting fine adjustment of $a_1$, $a_2$ and $a_3$ by the use of the above-described mechanisms.

By the provision of such adjust mechanisms, the present invention can provide highly precise delay lines and moreover, it can stably produce delay lines of sufficient precision for ordinary applications, without using the adjust mechanisms. This is because, once in the designing stage the relative positions of the cores and the tapped position of the coils are sufficiently considered and determined, the resultant delay lines are of uniform characteristic irrespective of some irregularities present in the parts since the coupling coefficients are in positionally stable regions.

Figure 8A:
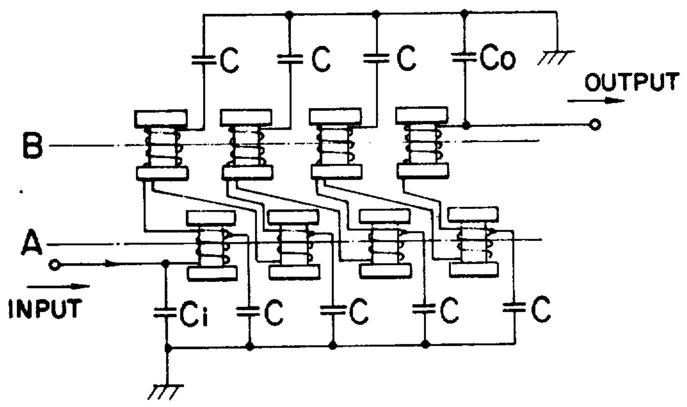

FIG. 8 shows a further embodiment of the present invention which differs from the embodiment of FIG. 1 in that the axes of the drum-shaped ferrite cores or of the coils are horizontal, instead of being vertical to the coil mounting surface as in FIG. 1. A further difference is that in FIG. 1 the turns of the coils in the rows A and B are opposite in direction so as to produce fluxes in the opposite directions, whereas in FIG. 8 the turns of the coils in both rows are in the same direction so as to produce fluxes in the same direction.

In the other points including the relative positions of the coils and electrical connection, the two embodiments are identical.

Figure 8B:
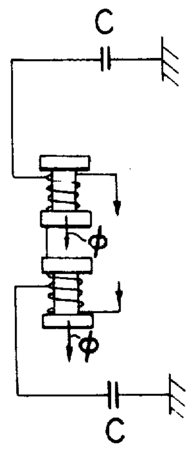

FIG. 8B, being similar to that of FIG. 1, shows a side view of two connected intermediate ones taken out of the eight coils.

Figure 9:
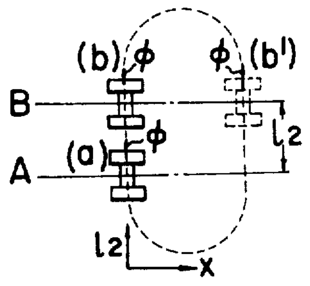
FIG. 9 illustrates the coupling condition between the coils.

Features of such construction will now be described with reference to FIGS. 9 and 10. FIG. 9 illustrates the coupling conditions between the coils in the row A and the coils in the row B. It is seen that when the axis of the coil (*b*) is aligned with that of the coil (*a*), the coupling of the coil (*a*) to the coil (*b*) becomes positive. When the axis of the coil (*b*) is substantially offset with respect to that of the coil (*a*) or brought to the position as indicated by dotted line (*b'*), the coupling of the coil (*a*) to the other coil becomes negative. In contradistinction therewith, in the construction of FIG. 1, the coupling between the coils in the rows A and B is always positive as previously described.

Figure 10:
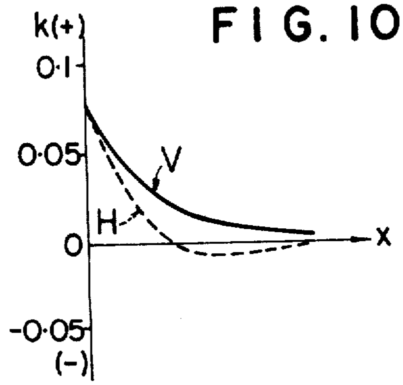
FIG. 10 is a graph illustrating the variations in the coupling coefficients.

FIG. 10 illustrates such difference. When the spacing $l_2$ between the two rows A and B has been suitably determined and if the coils in the row B are moved in the direction $x$ indicated in FIG. 9, then the coupling coefficient $k$ according to the construction of FIG. 1 presents a variation as indicated by a solid-line curve V, whereas the coupling coefficient $k$ according to the construction of FIG. 8 presents a variation as indicated by a dotted-line curve H. In other words, the solid-line curve V shows that with the increase of $x$, the coupling coefficient $k$ is gradually decreased toward zero, while the dotted-line curve H shows that with the increase of $x$, the coupling coefficient is decreased from the positive through zero to the negative and passes through a minimum point in the negative and gradually toward zero.

Features of the delay line according to the construction of FIG. 8 will now be described. When it is desired to derive tap signal outputs from the connection points of all capacitors C and to equalize the phase characteristics of the output waveforms as far as possible, since $a_{1a}$ and $a_{1b}$ according to the FIG. 1 construction slightly differ, as described above in connection with FIG. 4, the tendencies toward distortion of the output waveforms at each section will be correspondingly slightly different. In contrast, in the construction of FIG. 8, it may be said from the tendency of the dotted-line curve H described in connection with FIG. 10: when the coupling coefficients shown in FIG. 2 are considered with respect to the construction of FIG. 8, it is possible, with $k_3$ being of a suitable positive value, to render $k_{1a}$ and $(k_{1b})$ into extremely small but substantially equal negative values. This is because, according to the dotted-line curve H in FIG. 10, such adjustment is feasible as to render $k_3$ positive and in addition, to position $k_{1a}$ and $(k_{1b})$ respectively at the opposite sides of the negative minimum point in the curve H.

In the description of FIG. 1, $(k_{1b})$ has been omitted on the assumption that $k_{1a} >> (k_{1b})$, whereas in the construction of FIG. 8 $k_{1a} \approx k_{1b}$ and their values are extremely small, so that $a_{1a} = a_{1b} = a_1$ can safely be established.

However, the construction of FIG. 8 undergoes a higher rate of variation in coupling coefficient with respect to the variation of the direction $x$ and thus, involves the need to enhance the assembly precision.

FIG. 11 shows still a further embodiment of the present invention. In the interest of clarity and simplicity, coils and the connections thereof with capacitors are not shown, although it should be understood that they are similar in construction to those of FIG. 8. The construction of FIG. 11 differs from that of FIG. 11 in that the axes of the coils are inclined by an angle of $\theta$ with respect to the plane perpendicular to the rows A and B. According to such construction, as will be appreciated from what will appear hereinafter, more excellent characteristic can be realized by sringing the coils closer together, which in turn leads to a further smaller size of the resultant delay line. When the coupling coefficients shown in FIG. 2 are considered with respect to the construction of FIG. 11, this construction requires $l_1$ to be reduced in order to provide the same value of $k_2$ as in the construction of FIG. 8. The degree of such reduction depends on the value of $\theta$. Taking the case of $\theta = 90°$ as an example, all the coils in the rows A and B are aligned and the couplings between the coils in the row A and between the coils in the row B are all positive. But in the construction of FIG. 8 wherein $\theta$ equals zero, the couplings between the coils in the row A and between the coils in the row B are all negative.

From this, it can be seen that as the value of $\theta$ is gradually increased from zero, the absolute values of the couplings both between the coils in the row A and between the coils in the row B are decreased below zero and again rise up to the positive range. Thus, in order to still obtain negative couplings with the increase of $\theta$ from zero, the value of $l_1$ must gradually be decreased.

Also, the construction comprising cores inclined in the described manner can reduce the value of $l_2$ and moreover, permits the inter-coil spacing to be increased irrespective of the so reduced $l_2$. In this case, the value of $k_3$ being the same as in the embodiment of FIG. 8 means that the value of $l_2$ can be reduced and the value of $l_3$ can be reduced because the coils in the row B lie toward right by an amount corresponding to the angle of inclination, thus further reducing the lengthwise dimension. Such reduction in the values of $l_1$, $l_2$ and $l_3$ leads to a further reduced size of the delay line.

It will readily be analogized from FIG. 11 that the coils in the construction of FIG. 1 may also have their axes inclined. In addition, the direction of inclination may be lengthwise or widthwise of the lag line or intermediate thereof, and the resultant effect may readily be analogized from what has thus far been described.

Further, the coils in the rows A and B have been described as lying at the same level of mounting surface, whereas the coils in one row and the coils in the other row may lie at somewhat different levels to reduce the value of $l_2$, as will be apparent from what has been described hitherto.

The present invention, as will be appreciated from the foregoing description, has been developed for applications primarily in super-miniature high-performance delay lines and can provide a simple construction by using drum-shaped ferrite cores of relatively small size but capable of providing a relatively great value as inductance, as well as provide a highest characteristic by using a limited number of components.

For example, a super-miniature delay line constructed according to the present invention, which accommodates ten sections within a dual in-line type package of hight 6.3 mm, width 6.3 mm and length 20 mm and has a lag time of 100 ns and a characteristic impedance of 100 Ω, has exhibited an output pulse rise time of 13 ns and a waveform distortion of 5% for an input pulse rise time of 6 ns. As compared with the prior art delay lines of this type, these values correspond to a 20–30% improvement in characteristic and thus, the present invention can realize a high-performance delay line in spite of its super-miniature size.

It is apparent, however, that the present invention is effectively applicable not only to superminiature delay lines but also to many other delay lines if they have at least four inductance elements. It will also be apparent that the coil structure is not limited to coils wound on drum-shaped ferrite cores but coils may effectively be wound on various types of cores, and that coils which are not wound on cores, may also be employed.

What is claimed is:

1. A delay line device comprising a first group of coils arrayed in a first straight row and equally spaced apart from each other, and a second group of coils arrayed in a second straight row and equally spaced apart from each other, said first and second straight rows being in substantially parallel spaced relationship with each other, such that one of the coils in said first group is located at one end of said first straight row and is adapted to serve as an input coil and one of the coils in said second group which is located at that end of said second group which corresponds to the other end of said first straight row is adapted to serve as an output coil, said first and second groups of coils being arranged so that said input coil in said first group is located at a position corresponding to a position between the coil in said second group which remotest from said output coil and the coil in said second group which is most adjacent to said coil remotest from said output coil and said output coil in said second group is located at a position corresponding to a position between the coil in said first group which is remotest from said input coil and the coil in said first group which is most adjacent to said coil remotest from said input coil, wherein electrical connection in zigzag form is provided between said first and second groups of coils so that said input coil in said first group is connected to that coil in said second group which is remotest from said output coil, the last-named remotest coil being connected to the coil in said first group which is most adjacent to said input coil, and finally that one of the coils in said first group which is remotest from said input coil is connected to said output coil in said second group, a tap being provided on each of the coils in said first and second groups, each of said taps being grounded through a capacitor.

2. A delay line device according to claim 1, wherein the coils in each of said first and second groups are provided on one of the main surfaces of a base plate with their axes positioned in a plane which is substantially perpendicular with respect to said one main surface.

3. A delay line device according to claim 1, wherein the coils in each of said first and second groups are provided on one of the main surfaces of a base plate with their axes positioned in a plane which is substantially parallel with respect to said one main surface.

4. A delay line device according to claim 2, wherein the axes of said coils are inclined with respect to said perpendicular plane.

5. A delay line device according to claim 3, wherein the axes of said coils are inclined with respect to said parallel plane.

6. A delay line device according to claim 2, wherein the axial direction of each of the coils in said first and second groups are positioned such that the couplings between the most adjacent coils in said first and second groups are positive and that the couplings between the coils in each of said first and second groups are negative, and wherein the coils in said first group and those in said second group are disposed in offset relationship with each other.

7. A delay line device according to claim 3, wherein the coils in said first group and those in said second group are disposed in offset relationship with each other.

8. A delay line device according to claim 2, further comprising means for adjusting the spacing between said first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

9. A delay line device according to claim 3, further comprising means for adjusting the spacing between said first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

10. A delay line device according to claim 4, further comprising means for adjusting the spacing between first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

11. A delay line device according to claim 5, further comprising means for adjusting the spacing between said first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

12. A delay line device according to claim 6, further comprising means for adjusting the spacing between said first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

13. A delay line device according to claim 7, further comprising means for adjusting the spacing between said first straight row in which said first group of coils are arrayed and said second straight row in which said second group of coils are arrayed, means for adjusting the relative position between said first group of coils and said second group of coils in directions substantially parallel with said first and second straight rows, and means adjusting the couplings between the coils in each of said first and second groups.

* * * * *